United States Patent
Wu

(10) Patent No.: US 10,514,734 B2
(45) Date of Patent: Dec. 24, 2019

(54) SYSTEM COMPRISING MULTIPLE FUNCTIONAL MODULES AND ADDRESSING METHOD FOR FUNCTIONAL MODULES THEREOF

(71) Applicant: Dinkle Enterprise Co., Ltd., New Taipei (TW)

(72) Inventor: Shang-Tsai Wu, New Taipei (TW)

(73) Assignee: DINKLE ENTERPRISE CO., LTD., New Taipei (TW)

( * ) Notice: Subject to any disclaimer, the term of this patent is extended or adjusted under 35 U.S.C. 154(b) by 0 days.

(21) Appl. No.: 16/037,036

(22) Filed: Jul. 17, 2018

(65) Prior Publication Data
US 2019/0278341 A1 Sep. 12, 2019

(30) Foreign Application Priority Data
Mar. 9, 2018 (TW) .............................. 107108158 A

(51) Int. Cl.
G06F 1/18 (2006.01)
H01R 4/48 (2006.01)
H01R 9/26 (2006.01)
H01R 25/14 (2006.01)
H04L 12/40 (2006.01)

(52) U.S. Cl.
CPC .............. *G06F 1/185* (2013.01); *G06F 1/186* (2013.01); *H01R 4/4818* (2013.01); *H01R 9/2675* (2013.01); *H01R 25/142* (2013.01); *H04L 12/40* (2013.01); *H04L 12/40032* (2013.01)

(58) Field of Classification Search
None
See application file for complete search history.

(56) References Cited

U.S. PATENT DOCUMENTS

| | | | | |
|---|---|---|---|---|
| 4,912,471 A | * | 3/1990 | Tyburski | B61L 25/045 340/10.34 |
| 6,496,892 B1 | * | 12/2002 | Lake | G05B 19/0423 710/301 |
| 2013/0010018 A1 | * | 1/2013 | Economy | H04W 76/10 345/691 |
| 2016/0224083 A1 | * | 8/2016 | Dent | G06F 1/266 |
| 2016/0359741 A1 | * | 12/2016 | Cooper | B61C 17/12 |
| 2017/0225795 A1 | * | 8/2017 | Lin | H04W 8/26 |
| 2019/0034367 A1 | * | 1/2019 | Kakaiya | G06F 13/20 |

* cited by examiner

*Primary Examiner* — Michael Sun
(74) *Attorney, Agent, or Firm* — Bacon & Thomas, PLLC

(57) ABSTRACT

A system comprising a plurality of functional modules connected by a bus, each functional module comprising a photo emitter and a photo receiver, to transmit photo signals between two adjacent modules. A method for addressing the functional modules, wherein a control module broadcasts respective unique addresses to the bus and a photo enquiry signal to its downstream module to trigger the latter to pick up an address. Each module provides a photo enquiry signal to its downstream module, after it has picked up an address from the bus.

17 Claims, 4 Drawing Sheets

SYSTEM COMPRISING MULTIPLE FUNCTIONAL MODULES AND ADDRESSING METHOD FOR FUNCTIONAL MODULES THEREOF

BACKGROUND

1. Technical Field

The present invention relates to a novel structure of system comprising a plurality of functional modules, and more particularly to an addressing structure and addressing method of such a system. The present invention provides an optical signal-based method for addressing functional modules in the system, whereby re-addressing of the functional modules can be easily and rapidly implemented, after one functional module is added into or removed from the system.

2. Related Art and Problems Being Solved

The terminal box (or terminal block) is a commonly used functional module in the industry, in particular in forming a system with the combination of a plurality of terminal boxes. A terminal box generally provides a casing, and one or more circuit boards contained therein, to form one or multiple functional module. Each functional module is connected to a particular working machine, to control the operations of the working machine. In a factory, dozens to hundreds of working machines may be used, and each working machine may be connected to one or more functional modules. The functions of the terminal box are mainly to provide horizontal communication between functional modules. That is, to provide connections of electrical power, data, and control signals between different functional modules.

The connections between/among terminal boxes are realized by electrical contacts provided on the casing that allow electrical power, data and signals to pass. The known technology also provides a photo Transceiver module for optical communication between the functional modules in the terminal box and functional modules in other terminal boxes. To simplify the connections and communications between/among terminal boxes in a system, the known art also provides a longitudinal support rail, to which a plurality of terminal boxes can be affixed with the clamping mechanism provided at the bottom of the terminal boxes. The support rail allows the terminal boxes to align closely adjacent one another, so that the electrical contacts on the sides of the terminal boxes form electrical contacts. US Patent Publication No. US 2013/237067A1 discloses a "Data bus structure for terminal blocks and terminal blocks using the same," that further provides a bus structure in the support rail, whereby the plurality of terminal boxes can share power, data, and control signals via the bus structure.

The conventional terminal box provides power lines, data lines, and signal lines electrical contacts on the box body. There are two groups of electrical contacts provided on each box body, which are respectively arranged on both sides of the box body, symmetrically with each other. When all functional modules are arranged in series, for example in the above-mentioned side-by-side manner on a support rail, the electrical contacts on one side of a specific terminal box will contact the electrical contacts on the corresponding side of an adjacent other terminal box of the side. The electrical contacts on the other side are in turn connected to the electrical contacts on the corresponding sides of a third terminal box immediately adjacent to that other side. In order to ensure the formation and stability of the electrical connection, conventional terminal boxes are still required to provide engaging devices so that adjacent two terminal boxes can abut against each other without relative movements. A typical design of such a terminal box can be found in U.S. Pat. No. 5,716,241, entitled: I/O Device for Data Bus. Connectors that provide contacts in such terminal boxes are commonly referred to as T-shaped electrical connectors, such as those shown in U.S. Pat. No. 7,704,079, entitled: T-Shaped Shielded Bus Connector. In this connection, all the terminal boxes essentially form a series connection. The lines formed by the concatenation are a "bus;" power, signals, etc. that pass through the lines can be shared by all the terminal boxes.

The prior art terminal box is a communication method using a bus, and each functional module, that is, each terminal box, must be addressed or re-addressed before operation. In other words, the address or code of each terminal box (hereafter collectively referred to as the "address") must be set or reset before the combined application is performed. It is controlled by a controller or a control module (usually one of the terminal boxes). The control module assigns an address for each functional module in the terminal box; for the convenience of setting and management, if there is a plurality of functional modules in a terminal box, only one address is usually assigned. In this case, each address represents a functional module or a terminal box. From the perspective of addressing, each address represents a functional module. For convenience of explanation, the following description assumes that each terminal box contains only one functional module. If it is necessary to individually address more than one functional module in a terminal box, the conventional auxiliary addressing tools can be used.

However, terminal boxes currently used in industry do not usually provide automatic addressing functions. Addressing the terminal box usually uses an addressing tool to generate a unique address as the "default address" of the terminal box and to write it into the functional module of the terminal box. The address written in is identified as the address of the terminal box during operation. Another addressing method is manual, such as providing a dip switch for addressing on the terminal box. After the terminal box is placed on a support rail, a number or code is given according to a certain rule, and it is assigned as the address of the terminal box at the time of operation.

In U.S. Patent Publication 2004/195078, entitled: Integrated Conveyor Bed, there is also proposed a method of giving automatic addressing to a concatenated control module. According to the method, the main control module first sends an activation signal to the first one of a plurality of control modules connected by a "daisy chain" through the first segment of an automatic addressing line. This activation signal is not provided to other control modules. In response to the activation signal, the first control module sends a response signal, including a default address of the control module, to the bus. After receiving the response signal, the main control module sends an addressing command to the default address to the first control module. The addressing command contains the unique communication address assigned by the main control module. The first control module stores the communication address as the address used later in the system. Thereafter, the first control module sends an activation signal to a second control module on the downstream side. The second control module sends response to the bus with its default address. The main control module assigns another unique address to the second control module after receiving the response signal. The above addressing operation is repeated until all the control modules of the system have their communication addresses.

U.S. Patent Publication 2016/318714, entitled: "Method for Addressing/Sequencing Linearly Interlinked Control Components of a Conveying System" provides an improved automatic addressing method. The method includes addressing by a main control module to each downstream control module on one direction and addressing each downstream control module in another direction, followed by addressing the downstream control modules in one of the directions in a reversed sequence. The resulted addresses are used as the addresses of all control modules. The method obtains the physical location information of each control module through this process.

The above automatic addressing methods, however, are not directly applicable to a system that connects a plurality of functional modules using a bus system.

SUMMARY OF THE INVENTION

The purpose of the present invention is to provide a system comprising multiple that can automatically address the functional modules.

Another objective of the present invention is to provide a system comprising multiple functional modules that can be easily readdressed.

Another objective of the present invention is to provide a novel method for automatically addressing of a plurality of functional modules in a system comprising the functional modules.

According to the present invention, a system comprising a plurality of functional modules is provided, wherein the system comprises a plurality of functional modules arranged side-by-side. Each functional module comprises at least one circuit, a casing for accommodating at least a part of the circuit, an electrical connector electrically connecting the circuit and providing a plurality of contacts to directly or indirectly electrically connect contacts of an adjacent functional module, and a photo Transceiver comprising a photo receiver and a photo transmitter respectively provided on the both sides of the casing, for transmission of optical signals to and from a photo transmitter and a photo receiver on corresponding sides of the casing of adjacent functional modules. The plurality of functional modules includes a control module, configured to send, upon initialization of an addressing operation, an enquiry signal to a downstream adjacent functional module via its photo transmitter and an addressing command via at least one contact of its electrical connectors. The addressing command contains a unique address data. The enquiry signal triggers the downstream functional module to receive the addressing command, picks up the address data and record it as the address of the functional module. The enquiry signal further orders the downstream functional module to send an enquiry signal to its downstream adjacent functional module via its photo emitter. The control module is further configured to send another addressing command via at least one contact of its electrical connectors, after the one addressing command is sent, preferably after a predetermined time following the one addressing command.

The functional modules are further configured to: upon receipt of an enquiry signal by the photo receiver on one side, pick up an addressing command via at least one contact in its electrical connector and record the address contained therein as address of the functional module, followed by sending an enquiry signal via the photo transmitter on the other side to an adjacent functional module and sending a response signal representing completion of addressing to the control module.

In a preferred embodiment of the present invention, the control module determines addressing operation for all the functional modules is complete, if no response signal is received within a predetermined time after an addressing command. The addressing operation is thus ended.

In a preferred embodiment of the present invention, the photo receiver of a functional module adjacent to the control module is disposed on a side adjacent to the control module. The photo emitter is preferably a red LED emitter.

In a specific embodiment of the present invention, the contacts of the electrical connector of the functional modules are connected to a bus, that is, at least two of the contacts of each electrical connector are respectively connected to two wires in the bus. In such an embodiment, a clamping member is provided in each functional module for holding the supporting rail supporting the wires so that the at least two contacts can contact the wires stably. In such an embodiment, the bus may further comprise at least two power supply wires.

In a preferred embodiment of the present invention, the bus may further comprise an initialization signal line for controlling the automatic addressing operation. In such an embodiment, the control module is configured to pull the signal level of the initialization signal line to a first level via at least one of its contacts when an automatic addressing is initiated, and to pull the signal level to a second level at end of the addressing operation. Each functional module is further configured to enter the addressing operation when receiving the first level initialization signal via at least one contact in the electrical connector and to exit the addressing operation when receiving the second level initialization signal via at least one contact in the electrical connector. After the second level initialization signal is received, the functional module does not react to the enquiry signal or does not process any addressing command. In a particular embodiment, the functional module is configured to respond an error message, when a second level initialization signal is received via at least one of the contacts after an address has been recorded.

The above and other objectives and advantages of the present invention will become more apparent from the following detailed description with reference to the accompanying drawings.

DETAILED DESCRIPTION OF THE INVENTION

In the following, several embodiments of the invented system comprising a plurality of functional modules and method for addressing the plurality of functional modules will be described using certain preferred embodiments. However, the description of the embodiments of the present invention should not be used to limit the scope of the present invention.

The present invention provides a system comprising a plurality of functional modules that can automatically address and re-address the functional modules therein, i.e., assigning and reassigning address codes to the functional modules as an address in the system. The present invention also provides a novel automatic addressing method for functional modules in a system including same.

Figure 1:
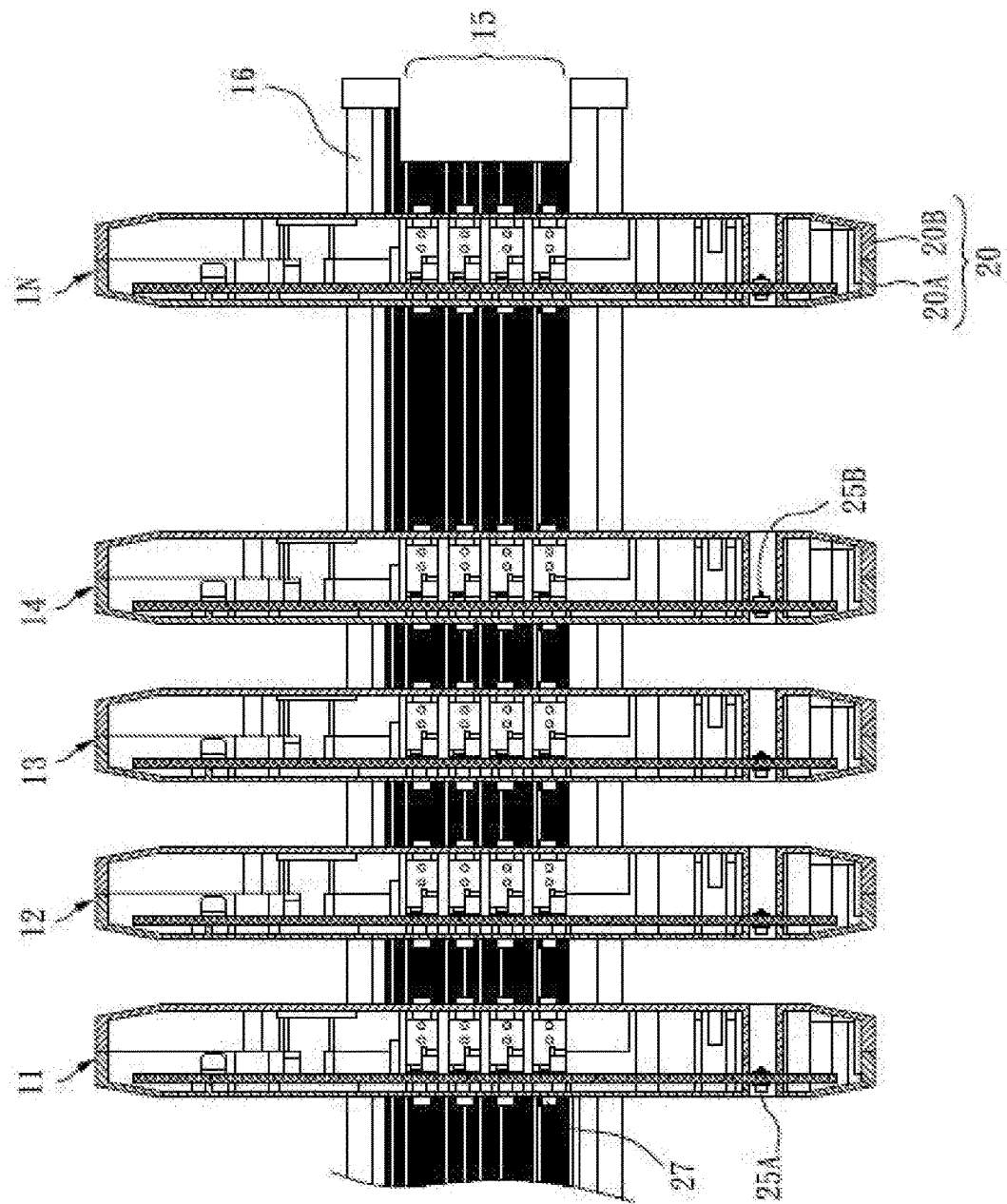
FIG. 1 shows the system diagram of an embodiment of a system comprising a plurality of functional modules according to the present invention.

FIG. 1 shows a system diagram of an embodiment of the system comprising a plurality of functional modules according to the present invention. As shown in the figure, the system to which the present invention is applied includes a plurality of functional modules 11, 12, 13, 14 . . . 1N. In this system, a control module 11 is included, wherein the control module 11 and the other functional modules 12-1N are mainly connected by a bus 15 and are all allocated at the same level of communication. This type of connection is often referred to as a bus topology or a linear bus. The present invention is certainly not limited to the above-mentioned bus topology; it can be used in, such as, a ring topology or a daisy chain topology.

There is a gap between two of the functional modules 11-1N shown in FIG. 1. But this is for the sake of clarity. In the preferred embodiments of the present invention, adjacent two functional modules are in close contact with each other, such that a photo receiver 25A (or photo emitter 25B) on a first side of one functional module is aligned to or in contact with a photo transmitter 25B (or photo receiver 25A) on a second side facing the first side in an adjacent other functional module and that the electrical contacts 27 on the first side of the one functional module are in contact with the electrical contacts 27 on the second side of the adjacent other functional module. If necessary, a clamping mechanism (not shown) can also be provided to clamp two adjacent functional modules so as to ensure a firm and tight contacts between the two.

FIG. 1 also shows that all the functional modules 11-1N are arranged on a support rail 16. A plurality of bus wires is provided on this support rail 16 to form a bus. Although not explicitly shown in the figure, it can be appreciated by referring to FIG. 2 that each functional module is electrically connected to the wires in the bus 15 through a plurality of pins 24. The architecture of the bus 15 may use, for example, the bus rail and the corresponding pins shown in U.S. Pat. No. 5,716,241. In the example shown in FIG. 1, each functional module 11-1N can share the power, data and control signals travelling on the bus 15. In addition, if the electrical connector 26 to which the electrical contacts 27 belong uses the T-shaped electrical connector shown in U.S. Pat. No. 7,704,079, the electrical connectors 26 on all functional modules 11-1N are also connected in series to form a bus system. In such an architecture, each functional module 11-N can further share power, data and control signals through the connection of the electrical connectors 26. However, in most applications the system does not need to provide both the rail-shaped bus and the bus formed by the T-shaped electrical connectors at the same time. In addition, the electrical connectors 26 can also be other types of electrical connectors, such as that simply connect an adjacent functional module.

Figure 2:
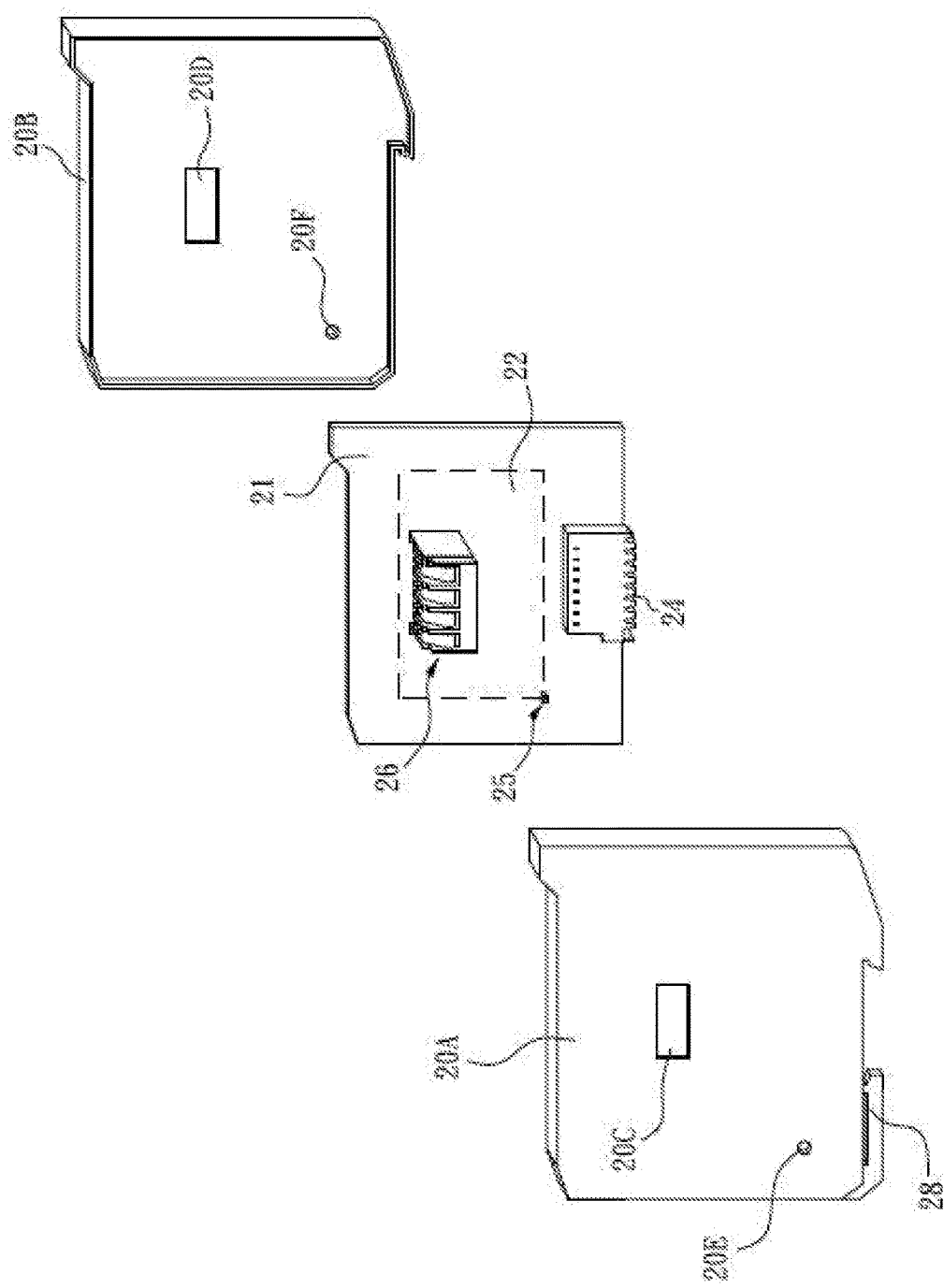
FIG. 2 shows the explosion figure of a functional module applicable to one embodiment of the invented system comprising a plurality of functional modules.

In the system of the present invention, each functional module 11-1N has the same basic architecture. FIG. 2 shows a schematic diagram of a functional module architecture applicable to an embodiment of the system comprising a plurality of functional modules according to the present invention. As shown in the figure, each functional module 11-1N includes one or more circuit boards 21, a first side housing 20A, and a second side housing 20B. The housings 20A and 20B on both sides can be combined into a casing 20, to provide a receiving space therein to accommodate the one or more circuit boards 21. Of course, the two-housing structure of the casing 20 is not any technical limitation. The number of the circuit boards 21 included in each functional module 11-1N is also not limited. However, necessary circuitry 22, indicated by the dashed box in FIG. 2, must be provided on the circuit board 21 to provide necessary functions such as input, output, calculation, judgment, control, memory etc. of the functional module.

In a common application example, the circuitry 22 generally includes at least one central processing unit (not shown), a memory unit (not shown), an input/output control unit (not shown), and the like, to receive through connectors provided in the circuitry 22 signals from an external device (not shown), to receive through the electrical connector 26 and/or pins 24 signals from other functional modules (including one control module of the plurality of functional modules 1-1N), to transmit after operations and judgements signals to the external device and/or to one of the other functional modules including the control module. The number of circuits included in the circuit board 21 of the functional modules 11-1N is not limited to one. The number of circuit boards 21 included in each functional module 11-1N and/or the number and type of circuits in each circuit board 21 may be the same or different. The operational, control etc. functions provided by each functional module 11-1N may be the same or different. Each functional module 11-1N can operate at the same time or separately. Each functional module 11-1N may provide virtually a plurality of operational or controlling modules, while physically forming a single functional module, that is, one accommodated in a single casing 20.

The system in which a plurality of functional modules 11-1N is connected directly in series by the electrical connector 26 to form a bus connection and/or indirect through the wires of a bus, is a typical embodiment of the system comprising a plurality of functional modules of the present invention.

An example of application that uses the system comprising a plurality of functional modules is the control system for a number of work machines in a factory. In such a system, a specific functional module may be connected to one or more working machines with control cables (not shown). There may be a plurality of functional modules connected to one working machine, and this one working machine communicates with the above-mentioned one or more work machines through the connections of their respectively corresponding functional modules. Each functional module may also be connected to a master control computer to accept control commands from the master control computer and to feedback results of execution of the commands to the master control computer. In a commonly seen application example, one of the plurality of functional modules 11-1N, for example, functional module 11, is a control module, and has the capability of generating control instructions. However, in another commonly seen application, one of the plurality of functional modules 11-1N, for example, functional module 11 is a control module, and is connected to a master control computer through a control cable.

Other configurations and applications of the system comprising a plurality of functional modules are known to those having ordinary skills in the art. Detailed descriptions thereof are thus omitted.

In order to satisfy the needs in the operation or control of the system comprising a plurality of functional modules, the functional module as shown in FIG. 2 may provide a plurality of connection pins fixed on the circuit board 21 for removable connections with signal cables. The cables (not shown) may be connected to external devices such as various working machines or computer devices. The other end of the plurality of connection pins is connected to the circuitry 22, to electrically connect the circuitry 22 with the external devices.

The functional module may also provide one or more electrical connectors 26, fixed in a specific position of the circuit board 21 and providing a plurality of electrical contacts 27 for connecting with electrical contacts of an electrical connector that are provided on corresponding positions of an adjacent functional module. The other end of the electrical connector 26 is connected to the circuitry 22, so that the circuitry 22 forms electrical connections with the circuitry of adjacent functional modules. The electrical connector 26 is preferably a T-shaped electrical connector as described above, with two shoulders thereof to be electrically connected to adjacent functional modules and one leg to be connected to the circuitry 22. A plurality of the T-shaped electrical connectors are connected in series to form a bus line and the multiple bus lines form a bus system. To facilitate the connection of the electrical connectors 26 of adjacent functional modules, through holes 20C, 20D are opened in corresponding positions of the housings 20A, 20B so that contacts of the electrical connectors 26 are exposed in the holes 20C, 20D and extend out of the casing 20.

The functional module may also provide one or more pins 24, fixed on one end of the circuit board 21, for electrically connecting the bus lines 15 disposed on the support rail 16. The other end of the pin 24 is connected to the circuitry 22, to electrically connect the circuitry 22 with the bus 15. The connecting end of the pin 24 is preferably formed with a clamping folk, for elastically holding the line on the bus 15. The plurality of bus lines forms a bus system, other than the bus system formed by the connectors 26. In order to facilitate the connection between the pin 24 and the bus lines, an opening is made in the corresponding end position of the housings 20A, 20B so that the pins 24 are exposed and protrudes out of the casing 20. This end of the casing 20 preferably forms a matching shape with the support rail 16 so that the support rail 16 may be engaged in the matching shape. If necessary, an elastic holding member 28 may be further provided to elastically clamp the support rail, after the support rail 16 is inserted and engaged into the matching shape. The clamping situation may be easily released by a user by simply pushing the holding member 28 outwardly.

Although the functional modules shown in FIGS. 1 and 2 simultaneously provide the bus system formed by the electrical connectors 26 and the bus 15 formed by the bus lines on the fixed rail 16, a person skilled in the art knows that in particular applications, only one of the two can be provided. Even if both are provided at the same time, they may not be used at the same time.

A functional module having the above-described structure and functions or a part thereof and a system comprising a plurality of such functional modules are well known in the industry and widely used in industry. Those having ordinary skills in the art are able to realize according to known technologies. Details thereof are thus omitted.

Figure 3:
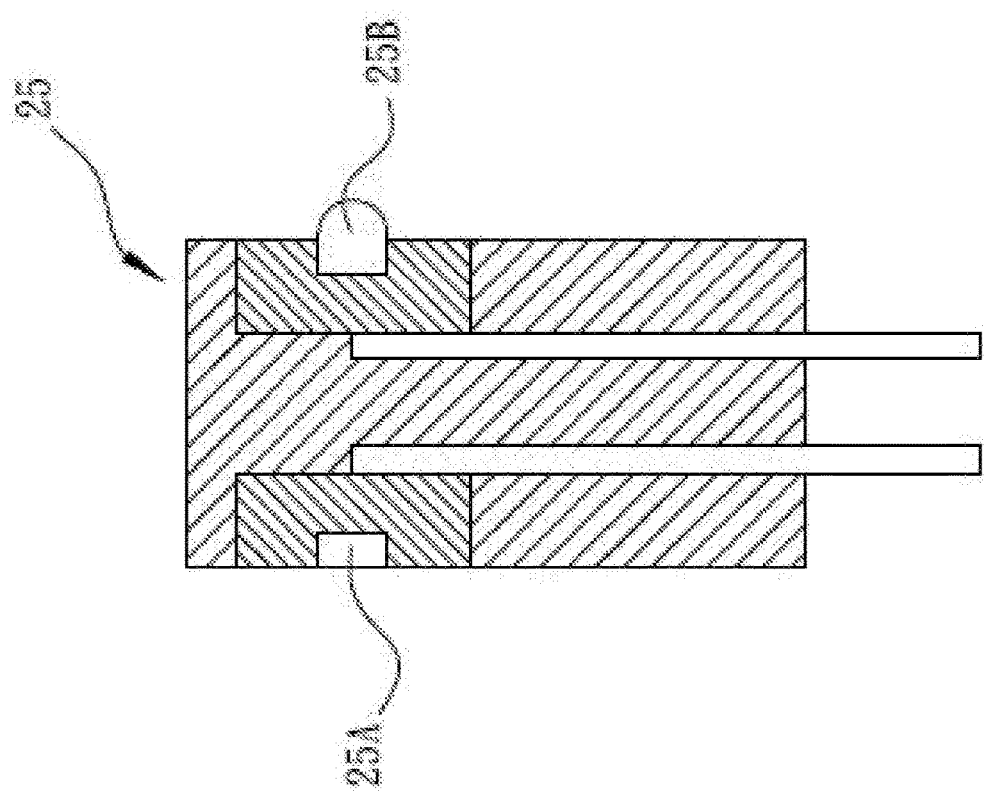
FIG. 3 shows the structural diagram of a photo Transceiver suitable for the present invention.

The functional module 11-1N of the present invention further provides a photo transceiver 25 on the circuit board 21. The photo transceiver 25 includes a photo receiver 25A and a photo emitter 25B, positioned opposite to the photo receiver. FIG. 3 is a structural diagram of a photo Transceiver 25 suitable for the present invention. As shown, the photo transceiver 25 includes a photo receiver 25A and a photo emitter 25B, wherein the photo emitter 25B is preferably a red light LED emitter. The receiving/transmitting directions of both substantially align to the same line. The photo transceiver 25 provided in each functional module is located at the said line. Through holes 20E and 20F are opened in corresponding positions on the housings 20A and 20B. When the plurality of functional modules 11-1N is connected in series, the receiving/transmitting direction of all the photo transceivers 25 is aligned substantially to the same line. The photo emitter 25B of one functional module 11 is oriented to the photo receiver 25A of the next functional module 12 on that side, and the photo emitter 25B of the next functional module 12 is oriented to the photo receiver 25A of the further next functional module 12 on that side. In this way, each functional module can use its photo transmitter 25B to send signals to the photo receiver 25A of its adjacent functional module.

It should be noted that in a preferred embodiment of the present invention, the photo emitter 25B of each functional module cannot transmit optical signals circumventing its neighboring functional module to a functional module next to the neighboring one. Therefore, the signal transmission system formed by the photo transceivers 25 is not a bus system. Further, although in the embodiment of FIG. 2, one photo transceiver 25 is provided for each functional module, therefore the formed photo communication system is a unidirectional signal transmission architecture, in some particular embodiments, however, two photo transceivers 25 with reversed photo transmission directions are provided in each functional module, to form a bidirectional signal transmission system. In most applications a unidirectional signal transmission system is sufficient to serve all necessary functions, i.e., the automatic addressing function of the present invention.

As described above, the plurality of functional modules 11-1N includes a control module 11. In the automatic addressing method of the present invention, all the addressing steps are mainly performed by the control module 11. However, the fact that functional module 11 is the control module does not necessarily mean that the functional module 11 is always the control center of all the plurality of functional modules 1-1N. In addition, the control module 11 does not necessarily need to be located at a specific location of the plurality of functional modules 11-1N, such as a terminal location. However, in the above-mentioned embodiment of the unidirectional photo signal transmission system, the control module 11 is preferably located at the terminal position of the system formed by the plurality of functional modules 11-1N. Specifically, the terminal position denotes to the position of the first photo transmitter in the photo transmission chain formed by the photo transceivers in the system comprising functional modules 11-1N.

In the following, the automatic addressing method of the system comprising a plurality of functional modules according to the present invention will be described by referring to FIG. 4, which is a flow chart of one embodiment of the automatic addressing method for a system comprising a plurality of functional modules. In the example shown in the figure, the system comprising a plurality of functional modules includes three functional modules, ie, a master control module 11, a first slave functional module 12 and a second slave functional module 13. However, the invented addressing method can be applied in a system including any number of functional modules. In addition, in the embodiment of FIG. 4, only the bus 15 provided on the support rail 16 is used, and the bus formed by the electrical connectors 26 is not used. The bus 15 may include 4 power lines (eg, 24V+− and 5V+−), an initialization signal line, and 2 signal transmission lines.

Figure 4:
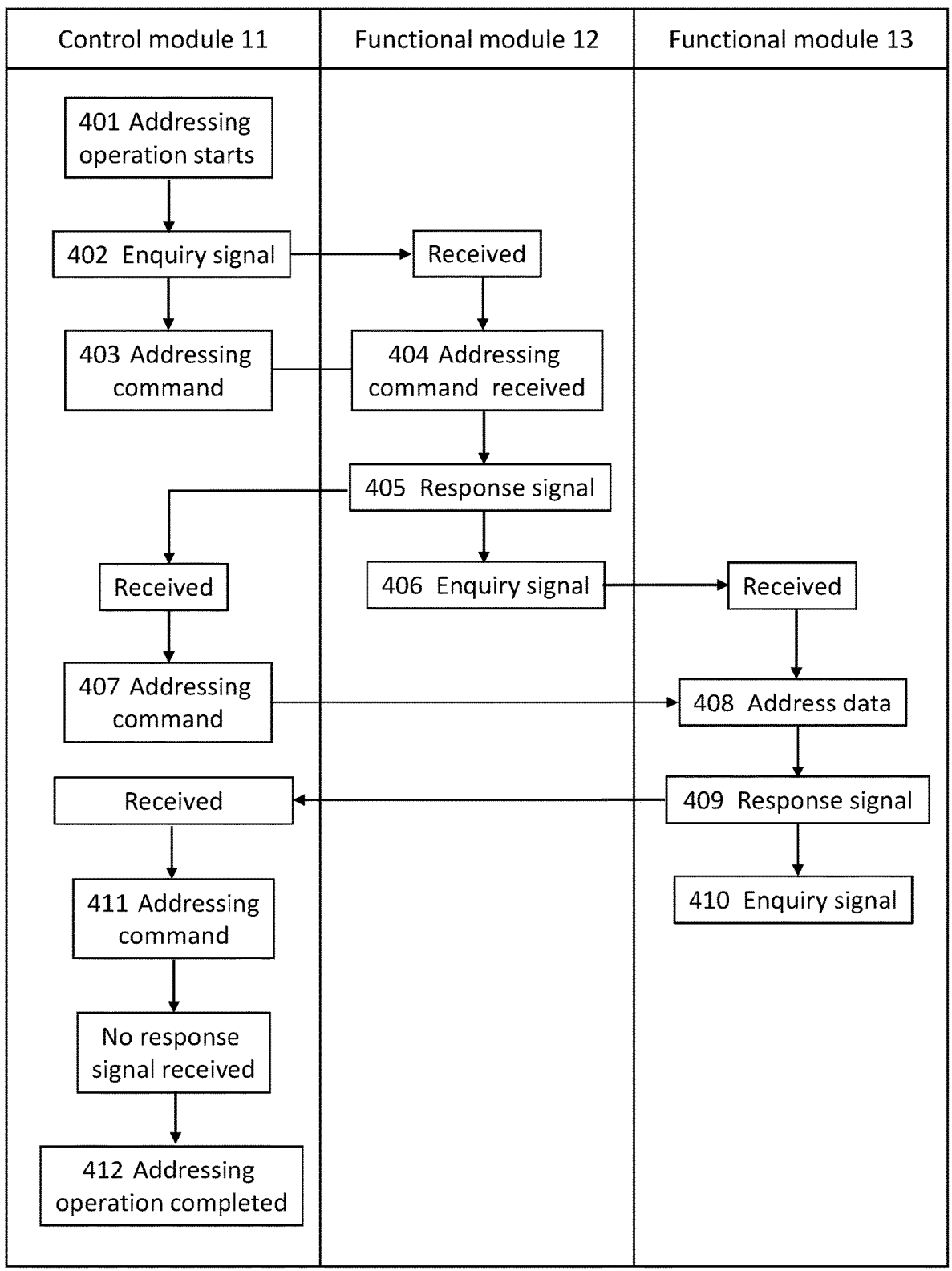
FIG. 4 shows the flowchart of a method for addressing functional modules in a system comprising a plurality of functional modules according to the present invention.

As shown in FIG. 4, in step 401, the control module 11 enters an addressing or re-addressing operation. Therefore, the control module 11 sets the signal on the initialization signal line in the system of bus 15 from a second level to a first level, such as, pulling from a low level to a high level, to command the other functional modules to initialize the addressing operation. In application, each functional module 11-1N may be configured to enter an addressing operation when receiving the high-level initialization signal, and to exit the addressing operation, i.e., not to react to a photo signal received from its photo receiver, after receiving the low-level initialization signal. Of course, those having ordinary skills in the art would appreciate that the system can also be configured to pull the signal on the initialization signal line from the high level to the low level to initialize the addressing operation. In other words, the first level and the second level are the selectable combination of a high level and a low level.

Thereafter, in step 402, the control module 11 sends an enquiry signal to its neighboring downstream functional module 12 via its photo transmitter 25B, and sends an addressing command to the bus 15 from its pin 24 at step 403. The addressing command contains a unique address data. In some other embodiments, the control module 11 sends an interrogation signal to its adjacent downstream functional module 12 via its photo transmitter 25B and sends an addressing command from the contact 27 of its electrical connector 26. Therefore, in the following description, "pin 24" and "contact 27" can be interchanged to achieve the same or similar effects. In step 404, the photo receiver 25A of the downstream functional module 13, i.e., the first slave functional module 12 receives the enquiry signal from its photo receiver and determines the signal an enquiry signal generated by the control module 11. The functional module 12 also determines that the initialization signal level is the first level. It thus picks up the addressing command from the bus 15 (or the contacts 27 of the electrical connector 26) and identifies the address data in the command. It then uses the address contained in the addressing command as the address of the functional module 12 in this system. In this step 404, the other functional modules 13-1N does not receive the enquiry signal, so the addressing command will not be picked up from the bus 15, or will be simply ignored.

In step 405, the functional module 12 sends a response signal representing completion of addressing to the main control module 11, and sends an enquiry signal to the adjacent functional module 13 on the downstream side via its photo transmitter 25B in step 406. The response signal can be sent via the bus 15, designating the main control module 11 as receiver. After receiving the response signal from the functional module 12, the control module 11 sends a second addressing command to the bus 15 via its pin 24 at step 407. In a preferred embodiment of the present invention, the control module 11 preferably sends an addressing command to the bus 15 via the pin 24 after a predetermined time has elapsed, regardless of the response signal. In such embodiments, the functional module that has completed its addressing operation needs not to send the response signal.

In this step 407, the addressing command contains another unique address data. In step 408, the photo receiver 25A of the second slave functional module 13 receives the photo signal emitted by the photo transmitter 25B of the first slave functional module 12 and determines it an enquiry signal. The second slave functional module 13 then determines the initialization signal level is at a high level, thus picks up the second addressing command from the bus 15 and uses the address contained therein as its address in the system. Similar to the foregoing, in this step 408, no other functional modules 12, 14-1N receive the enquiry signal, so that only functional module 13 picks up the second addressing command from the bus 15.

In step 409, the functional module 13 sends a response signal representing completion of the addressing operation to the main control module 11 and sends an enquiry signal to its downstream side via its photo transmitter 25B in step 410. In step 411, the control module 11 sends a third addressing command to the bus 15 via its pin 24 after receiving the response signal of the functional module 13 or after a predetermined period of time. These addressing steps are repeated until the addressing is completed. In the example of FIG. 4, there is no further functional module on the downstream side of functional module 13. The optical signal transmitted by the functional module 13 is not receivable by any other functional module. Therefore, the third addressing command will not be picked up by the functional modules so that no functional module will send a response signal representative of completion of the addressing. In step 412, the control module 11 does not receive any response signal within a predetermined time after sending the third addressing command. It determines that the addressing operation has been completed. Therefore, the level of the initialization signal line is pulled low. This concludes the addressing operation.

In an embodiment of the present invention, the functional modules 12-1N are configured to check whether a new address has been assigned to it, when it receives the second level initialization signal. If the result is NO, an error message is returned to the control module 11. The control module 11 can once again pull the initialization signal level to the first level for re-addressing operation. The procedure for re-addressing is basically the same as described above. Detailed descriptions thereof are thus omitted. As for the timing of this check, it is preferable set to when the level of the initialization signal line is pulled from the first level to the second level on time. At this time, the CPU of each functional module 12-1N would be interrupted, because the level of the initialization signal line is pulled from the first level to the second level, giving the CPU a time to check whether it has obtained a new address. Technologies for the check and its implementation are both known in the art. Although it is also possible to check from time to time, such an approach is not recommendable, because it will lead to poor system performance.

According to the above description, the automatic addressing method of the present invention is for use in a system having the above architecture, and the method comprises the following steps:

a. The control module enters the addressing operation. The control module may initialize the addressing operation by way of, for example, pulling the initialization signal from a first level to a second level.

b. The control module sends an enquiry signal to its adjacent downstream functional module via its photo transmitter, and sends an addressing command to a bus. The addressing command contains a unique address data.

c. The enquiry signal orders the neighboring downstream functional module to receive the addressing command, pick up the address data, and use the address as its address in the system.

d. The downstream functional module sends an enquiry signal to its neighboring functional module in the downstream side via its photo transmitter, and sends a response signal representing completion of the addressing operation to the control module.

e. The control module sends another addressing command to the bus. The addressing command contains another unique address data.

Repeat the above steps c. to e. until all functional modules in the system are assigned an address. Lastly, the control module exits the addressing operation.

Alternatively, the control module may also send a second addressed command after a predetermined time from a first addressing command, via a pin to the bus or via at least one contact of its electrical connectors. The step of the control module entering the addressing operation may include the step of pulling the signal level of the initialization signal line to a first level, and the step of the control module exiting the addressing operation may include the step of pulling the signal level to a second level. In this embodiment, the step of receiving the addressing command may include the following steps: determining a signal level of the initialization signal line by a functional module after receiving the query signal, picking up the addressing command if the signal level is the first level; and picking up no addressing command if the signal level is the second.

In addition, when a functional module determines the signal of the initialization signal line is pulled from the first level to the second level, it can check whether a new address has been assigned to it. If the determination is negative, the functional module responds an error message to the control module.

As described above, the present invention provides a novel architecture for a system comprising a plurality of functional modules having, and an automatic addressing method for the plurality of functional modules. Due to the use of the photo signal architecture, the functional modules in the invented system of can efficiently transmit addressing signals without using a clamp means. The resulting functional modules are easy to install and detach. After adding or removing a functional module, the system can be easily addressed or re-addressed at any time. High efficiency in system control is thus achieved.

What is claimed is:

1. A system comprising a plurality of functional modules arranged closely side-by-side, wherein each functional module comprises at least one circuit, a casing for accommodating at least a part of the circuit, an electrical connector electrically connecting the circuit and providing a plurality of electrical contacts to electrically connect electrical contacts of an adjacent functional module, and a photo transceiver comprising a photo receiver and a photo transmitter respectively provided on both sides of the casing for transmission of photo signals to and from a photo transmitter or receiver on a corresponding side of the adjacent functional module;

wherein the contacts of the electrical connectors of each functional module are connected to a bus, wherein the bus comprises at least two bus lines such that at least two contacts of each functional module are respectively connected with the least two bus lines and each functional module uses corresponding contacts to connect the same bus lines;

wherein the bus lines are supported on a rail, and the casing of each functional module is equipped with a holding member for clamping the rail supporting the bus lines, to ensure connections of the corresponding contacts and the bus lines;

wherein the plurality of the functional modules includes a control module, configured to send an enquiry signal to its adjacent downstream functional module via its photo transmitter, and to send an addressing command, comprising a unique address data, by at least one contact in its electrical connector;

wherein each functional module is configured to receive the addressing command, pick up the address data, and use the address as its address in the system, upon receipt of the enquiry signal, followed by sending an enquiry to an adjacent functional module at the downstream side via its photo transmitter; and wherein the control module is further configured to send a second addressing command via at least one contact of its electrical connector, at a time after it sends a first addressing command.

2. The system of claim 1, wherein the master module is configured to send the second addressing command after a predetermined time of the first addressing command.

3. The system of claim 1, wherein each functional module is configured to send a response signal representing completion of an addressing operation to the control module, after it has picked up an address data and used the address as its address and the control module is further configured to send the second addressing command after receipt of a response signal relating to the first addressing command.

4. The system of claim 3, wherein the main control module is further configured to determine an addressing operation is completed, if no response signal is received within a predetermined time after an addressing command.

5. The system of claim 1, wherein the photo receiver of a functional modules adjacent to the control module is disposed on a side of the casing adjacent to the control module.

6. The system of claim 1, wherein the photo emitter is a red light LED emitter.

7. The system of claim 1, wherein the buses comprises at least two power lines.

8. The system according to claim 1, wherein the bus further comprises an initialization signal line.

9. The system of claim 8, wherein the control module is further configured to pull the initialization signal line to a first level, to initialize an addressing operation, and to pull the initialization signal line to a second level, to end the addressing operation.

10. The system of claim 9, wherein each functional module is configured to react to a signal receive from its photo receiver, only when the initialization signal received by at least one contact of its electrical connector is in the first level.

11. The system of claim 9, wherein each functional module is further configured to check whether a new address has been assigned to it, when receiving a second level initialization signal, and to send an error message to the control module, if result of the check is negative.

12. An automatic addressing method for assigning addresses to a plurality of functional modules in a system comprising the plurality of functional modules, wherein the functional modules include a control module and are arranged closely side-by-side, wherein each functional module comprises at least one circuit, a casing for accommodating at least a part of the circuit, an electrical connector electrically connecting the circuit and providing a plurality of electrical contacts to electrically connect electrical contacts of an adjacent functional module, and a photo transceiver comprising a photo receiver and a photo transmitter respectively provided on both sides of the casing for transmission of photo signals to and from a photo transmitter or receiver on a corresponding side of the adjacent functional module;

the method comprising the following steps:
a. the control module enters an addressing operation;
b. the control module sends via its photo transmitter an first enquiry signal to a downstream adjacent functional module adjacent to the control module and sends a first addressing command from at least one contact in the electrical connector; wherein the addressing command contains a unique address data;
c. the downstream functional module receives the addressing command, picks up the address data, and uses the address as its address in the system;
d. the downstream functional module sends an enquiry signal to a further downstream functional module via its photo transmitter;
e. the control module sends a second addressing command via at least one contact of its electrical connector; the second addressing command contains another unique address data;
f. repeat the above steps c. to e. until all functional modules are assigned an address; and
g. the main control module exits the addressing operation, wherein the electrical contacts of the electrical connectors of each functional module are connected to a bus, wherein the bus comprises a plurality of bus lines, with one bus line being an initialization signal line; wherein step a of entering the addressing operation of the control module comprises the step of pulling the initialization signal line to a first level, and wherein step g of exiting the addressing operation further comprises the step of pulling the initialization signal line to a second level.

13. The method of claim 12, wherein the control module sends the second addressing command after a predetermined time from the first addressing command.

14. The method of claim 12, wherein each functional module further sends a response signal representing an address has been assigned, after the functional module sends an enquiry signal to its downstream functional module; and
wherein the control module sends the second addressing command after receiving the response signal.

15. The method of claim 12, wherein the photo emitter is a red light LED emitter.

16. The method of claim 12, wherein step c. comprises the following steps:
the downstream functional module determines a level of the initialization signal line, after receipt of the enquiry signal;
the downstream functional module receives the addressing command, if the initialization signal line is in the first level; and
the downstream functional module ignores the addressing command, if the initialization signal line is in the second level.

17. The method of claim 12, further comprising the following steps:
the functional module determines whether an address has been assigned to it, when level of the initialization signal line is pulled from the first level to the second level; and
the functional module sends an error message to the control module, if result of the determination is negative.

* * * * *